United States Patent
Keaney et al.

(10) Patent No.: US 7,062,703 B1
(45) Date of Patent: Jun. 13, 2006

(54) EARLY DETECTION OF FALSE START-OF-PACKET TRIGGERS IN A WIRELESS NETWORK NODE

(75) Inventors: Richard A. Keaney, Manly (AU); John D. O'Sullivan, Hunters Hill (AU); Brian Hart, Wollstonecraft (AU); Philip J. Ryan, Stanmore (AU); Kurt A. Lumbatis, Akron, OH (US); Kevin C. H. Wong, St. Leonards (AU)

(73) Assignee: Cisco Technology, Inc, San Jose, CA (US)

( * ) Notice: Subject to any disclaimer, the term of this patent is extended or adjusted under 35 U.S.C. 154(b) by 399 days.

(21) Appl. No.: 10/629,383

(22) Filed: Jul. 28, 2003

(51) Int. Cl.
*H04L 1/00* (2006.01)
*H04L 1/20* (2006.01)

(52) U.S. Cl. ...................... 714/807; 714/811
(58) Field of Classification Search ............. 714/807, 714/811
See application file for complete search history.

(56) References Cited

U.S. PATENT DOCUMENTS

| | | | | |
|---|---|---|---|---|
| 5,636,140 A | * | 6/1997 | Lee et al. ................ | 370/469 |
| 5,987,033 A | * | 11/1999 | Boer et al. ............... | 370/445 |
| 6,754,195 B1 | * | 6/2004 | Webster et al. ........... | 370/335 |
| 2003/0135797 A1 | * | 7/2003 | Choi ....................... | 714/704 |
| 2003/0231658 A1 | * | 12/2003 | Liang et al. ............. | 370/469 |
| 2004/0010746 A1 | * | 1/2004 | Lucas et al. ............ | 714/781 |
| 2004/0022225 A1 | * | 2/2004 | Liang et al. ............. | 370/338 |
| 2004/0032825 A1 | * | 2/2004 | Halford et al. .......... | 370/208 |
| 2004/0111663 A1 | * | 6/2004 | Lewis ..................... | 714/776 |
| 2004/0128589 A1 | * | 7/2004 | Lewis ..................... | 714/700 |
| 2004/0247125 A1 | * | 12/2004 | McClellan ............... | 380/262 |
| 2005/0025080 A1 | * | 2/2005 | Liu ........................ | 370/311 |
| 2005/0036570 A1 | * | 2/2005 | Kwak et al. ............. | 375/316 |

* cited by examiner

*Primary Examiner*—Stephen M. Baker
(74) *Attorney, Agent, or Firm*—Dov Rosenfeld; Inventek

(57) ABSTRACT

An apparatus, a carrier medium storing instructions to implement a method, and a method in a node of a wireless network able to receive packets that exactly or substantially conform to a wireless network standard according to which each packet includes a header having bits that have respective correct values in the case that the packet exactly conforms to the standard. The method includes receiving a start-of-packet (SOP) trigger that indicates that a packet may have been received, checking one or more bits in the header to determine whether or not they have their respective correct values, and continuing to process the packet in the case that the checking indicates that the checked bits have their respective correct values. In one implementation, the header includes a first field modulated at a known rate that has one or more reserved bit locations, and a second field modulated at a data rate indicated in the first field. In such an implementation, the checking includes processing the first field and checking one or more bits in the first field to determine whether or not they have their respective correct values, and, if the checked bits of the first field have their respective correct values, checking the second field for integrity.

27 Claims, 8 Drawing Sheets

Rsv = Reserved
Par = Parity
L11 = Length[11]
S0 = Service[7]

EARLY DETECTION OF FALSE START-OF-PACKET TRIGGERS IN A WIRELESS NETWORK NODE

BACKGROUND

This invention is related to wireless networks, and in particular, to a method and apparatus for the early detection of false receiver start-of-packet (SOP) triggers at a station (STA) in a packet-based wireless network such as a wireless local area network (WLAN).

Wireless networks are known and their use is becoming widespread. The IEEE 802.11 standard for local area networks describes variants in the 2.4 and 5 GHz range. A node of a wireless network such as one conforming to one of the variants of the IEEE 802.11 standard includes a radio transceiver/modem providing physical layer level (PHY) processing and a MAC processor. The receiver of the physical layer processor (the PHY processor) needs to accurately detect the SOP. Conventional receivers use a received signal strength indicator (RSSI) for so detecting the SOP. See for example, U.S. patent application Ser. No. 10/095,668, titled AUTOMATIC GAIN CONTROL AND LOW-POWER START-OF-PACKET DETECTION FOR A WIRELESS LAN RECEIVER to inventors Ryan, et al, filed: Mar. 8, 2002, Attorney/Agent Ref. No. CISCO-5227, that describes a low-power SOP detector based on RSSI. Patent application Ser. No. 10/095,668 is incorporated herein by reference. In addition, the IEEE 802.11a and 802.11g (OFDM) standards include sending a SIGNAL field in the first section of the packet that describes the modulation type and coding rate for the payload of the packet. The SIGNAL field is not very well protected—only a single parity bit is provided. As a result, there are many false triggers where the parity bit falsely indicates a valid SIGNAL field. As a result, the wireless node of the network is unnecessarily blocked from receiving valid packets while it processes what is effectively useless information. Moreover, the wireless node will not perceive that this is a bad packet until it has completely finished processing the packet and detected that the payload fails its frame checksum (FCS) check, which is much more robust than the single parity bit protecting the SIGNAL field.

Thus there is need in the art for fast and early detection of false SOP triggers.

SUMMARY

Disclosed herein is an apparatus, a carrier medium storing instructions to implement a method, and a method in a node of a wireless network able to receive packets. The packets exactly or substantially conform to a wireless network standard according to which each packet has a header including reserved bit locations containing bits set to a known value and specified bit locations with bits set according to legal/expected combinations in the case that the packet exactly conforms to the standard. One embodiment of the method includes receiving a start-of-packet (SOP) trigger that indicates that a packet may have been received, checking one or more bits in the header to determine whether or not they have their respective preset values in the case of reserved bit locations or legal/expected combinations, and continuing to process the packet in the case that the bits of the header pass the test, e.g., that the checked reserved bit locations have their respective preset values and/or the combinations are not illegal or unexpected. We refer to header bits that have their preset values if they are reserved bit locations or header bits that do not have an illegal or unexpected combination as header bits that have "correct" values.

In one embodiment, the header includes a first field modulated at a known rate that has one or more reserved bit locations, and a second field modulated at a data rate indicated in the first field. In such an embodiment, the checking includes processing the first field and checking one or more bits in the first field to determine whether or not they have their respective correct values, and, if the checked reserved bit locations of the first field have their respective correct values, checking the second field for integrity.

In one embodiment, the packet optionally includes an indication of whether or not reserved bit locations of the second field include an error detecting code formed from at least part of the first field. In such an embodiment, checking the second field for integrity includes checking the indication to ascertain whether or not reserved bit locations of the second field include an error detecting code. If it is ascertained that such an error detecting code is included, the checking includes checking the included error correcting code. If it is ascertained that an error detecting code is not included, the checking includes checking one or more reserved bit locations in the second field to determine whether or not they have their respective preset values.

In one embodiment, the method further includes providing a measure of the received signal quality; and checking whether the received signal quality measure is above a set level, such that the SOP trigger is ascertained to be a false trigger in the case that the received signal quality measure is not above the set level. In one implementation, the measure of the received signal quality is a measure of the error vector magnitude (EVM).

DETAILED DESCRIPTION

Described herein are a method and apparatus that can detect relatively early whether or not there is a false SOP trigger in a receiving node of a WLAN. Communication in the WLAN is in the form of packets, and each packet has a header. According to which WLAN standard the node conforms, e.g., one of the IEEE 802.11 OFDM standards, some bit locations in the header of the packet are "reserved." Typically, these reserved bit locations have known values, e.g., 0, for packets that exactly conform to the standard. Furthermore, some bits in the header have only certain combinations that are legal. We refer to header bits that have their preset values if they are reserved bit locations or header bits that do not have illegal or an unexpected combination as header bits that have "correct" values. One implementation of the invention includes the transmitter building packets that are exactly conforming. At the receiving node, once an SOP trigger is received, one embodiment of the method examines these bits of the header of a packet after receiving a start-of-packet trigger in the receiving node to ascertain whether or not the bits meet the requirements for the particular standard, and hence whether the packet is valid, or the result of a SOP false trigger. In yet another aspect of the invention, some of the bits in the header, in particular some of the reserved bit locations in the SERVICE field of a header conforming to one of the IEEE 802.11 OFDM standards, are used by a non-conforming transmitter—a transmitter that "substantially" but not exactly conforms to the standard—to add error detecting, e.g., CRC bits to better detect errors in the SIGNAL field. At the receiving node, there is a reduced likelihood of a false trigger being seen as a valid packet, e.g., an incorrect SIGNAL field having a correct set of CRC bits.

The invention will be described in terms of a WLAN station that operated according to OFDM variants of the IEEE 802.11 standard and proposed amendments. One receiver embodiment supports the IEEE 802.11a and g variants operating in the 2.4 GHz and 5 GHz frequency ranges, respectively. The invention is also applicable to a radio that operates under any other wireless standard for which early detection of a false SOP trigger is important, including other variants of the IEEE 802.11 standard.

Figure 1:
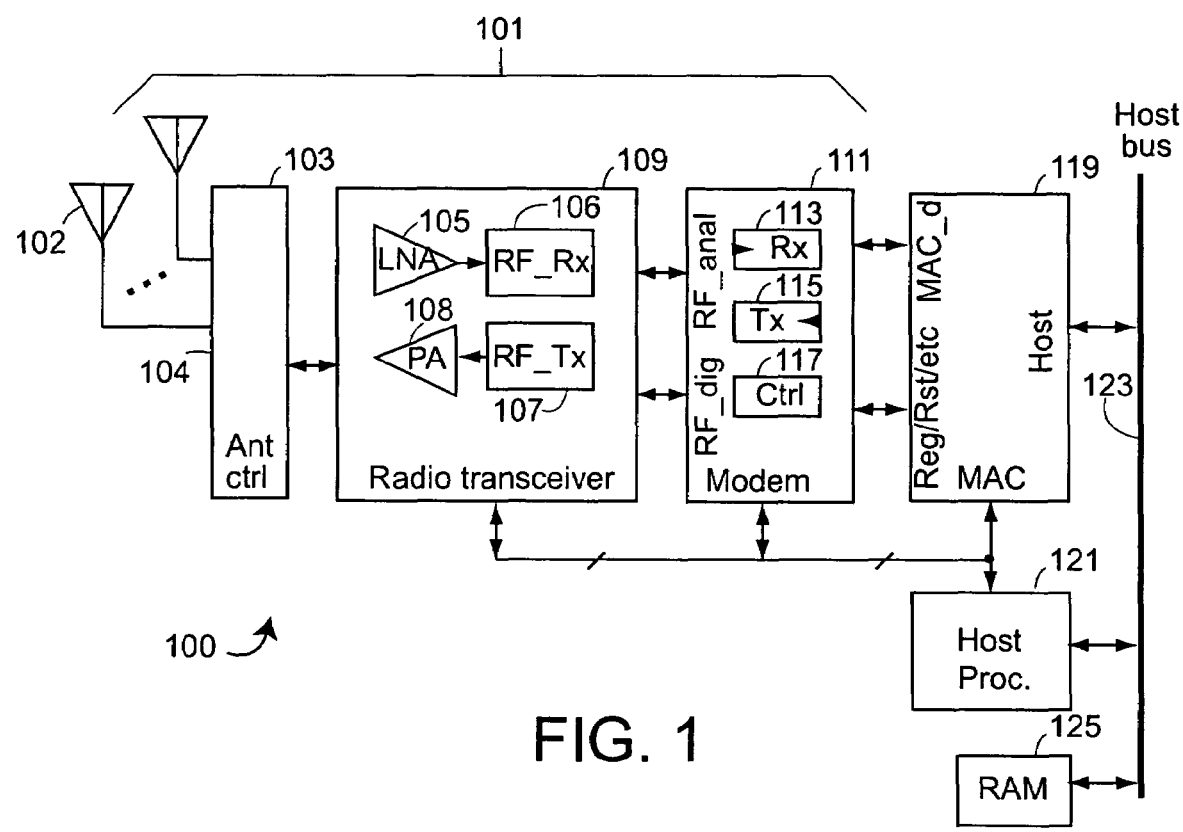
FIG. 1 shows a simplified functional block diagram of a wireless network node that includes an embodiment of present invention.

FIG. 1 is a functional block diagram of a wireless network node 100 that includes an embodiment of present invention. The node 100 might be, for example, implemented on a PCMCIA wireless LAN card, and includes a physical layer interface (PHY processor) 101 that includes an antenna subsystem 102 with at least one antenna for the frequency or frequencies of service (approx. 2.4 GHz and/or approx. 5 GHz), and an antenna subsystem 103 that for the case half-duplex operation includes a transmit/receive (T/R) switch, and for the case of diversity, includes a diversity switch to select an antenna. The antenna subsystem is coupled to a radio transceiver 109 that in one embodiment is implemented as a single chip. The receive chain of the transceiver includes a low-noise amplifier (LNA) 106 and receiver radio frequency (RF) electronics 106. The transmit part of the transceiver 109 includes transmit RF electronics 107 and a power amplifier (PA) 108. The transceiver provides an analog received signal to and accepts an analog signal for transmission from a modem 111 that includes a receiver part 113, a transmitter part 115, and a control part 117 that, for example, implements start of packet (SOP) detection, automatic gain control, and aspects of the invention, including early false SOP detection. The modem is coupled to the radio transceiver via an RF analog interface for the received signal and signal for transmission, and via an RF digital interface for such control signals as gain control and status.

The system 100 further includes a medium access controller (MAC) processor 119 for layer-2 processing. The MAC processor accepts payload data from the modem, and provides payload data to the modem 111 via a data interface. The MAC processor further is connected to the modem 111 via a digital interface that provides access to the MAC processor of various status and data registers in the modem 111.

In one embodiment, the MAC processor is coupled to a host processor 121 via a host bus subsystem 123. While FIG. 1 shows a separate host processor, the host processor function may in other embodiments be incorporated with the MAC processor 119. In one embodiment, a memory, e.g., a random access memory element (RAM) 125 is included for program storage. The memory 125 may be directly coupled to the host or to the MAC processor or to both. There may also be additional memory, e.g., for buffering, and for simplicity, such additional memory will be assumed to be included in memory 125. One or more interfaces may be included, e.g., one or more interfaces that conform to well-known industry standards PCMCIA, PCI, USB, and so forth.

Some embodiments may use antenna diversity, e.g., two or more transmit antennas or two or more receive antennas or multiple antennas for both receiving and transmitting. The diversity may be provided by spatial diversity, or by having different polarizations at the antennas, and so forth. The antennas may be switched or combined. Such processing is known to improve performance in environments that include fading, and may even be used to provide spatial division multiple access (SDMA).

One embodiment of system 100 is compatible with one or more variants of the IEEE-802.11 standards for wireless local area network (LAN) applications. The RF transceiver 109 and modem 111 constitute a complete wireless engine for OSI Layer-1 physical layer (PHY) functionality for one or more of the IEEE-802.11 PHY variants, and the (MAC) 119 is substantially IEEE-802.11-compatible. One aspect of the invention modifies some aspects of the IEEE-802.11 to provide better early false SOP detection.

One embodiment of the invention is applicable to communicating using OFDM packets that conform to the OFDM variants of the IEEE 802.11 standard. Such an OFDM packet starts with a preamble. The preamble provides for start of packet (SOP) detection, automatic gain control (AGC), diversity selection when diversity is used, various other synchronization functions, and channel estimation. The preamble is followed by the modulated payload.

Figure 2A:
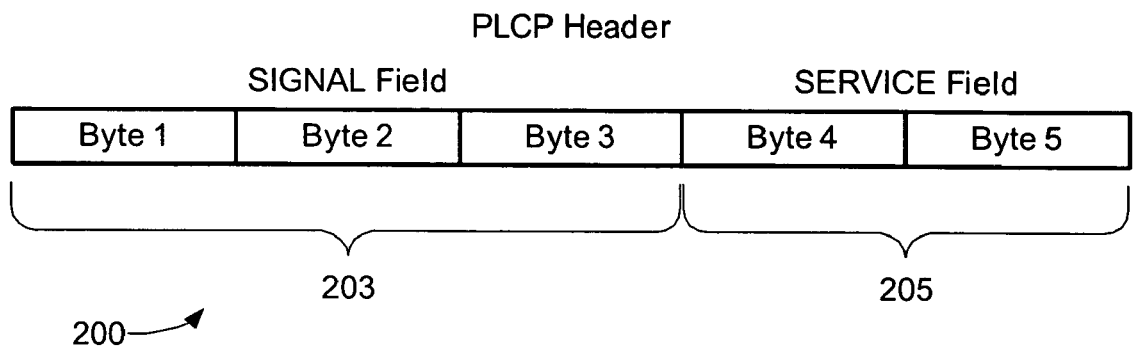
FIG. 2A shows a Physical Layer Control Protocol (PCLP) header that conforms to the OFDM variants of the IEEE 802.11 standard.

The modulated payload in turn starts with the Physical Layer Control Protocol (PCLP) header. FIG. 2A shows a PCLP header 200 that conforms exactly to the OFDM variants of the IEEE 802.11 standard. The PCLP header starts with a 3-byte SIGNAL field 203 that is modulated at a low data rate, in particular, SIGNAL is modulated at BPSK at rate 1/2 and provides information about the packet, including the data rate at which the rest of the packet in encoded. One embodiment uses reserved bit locations in the SIGNAL field to check for receive packet integrity. Another embodiment further checks the SIGNAL field to ensure that the combinations of bits are not illegal or unexpected. The SIGNAL field 203 is followed by a 2-byte SERVICE field 205 that is modulated at the payload data rate specified in SIGNAL. One embodiment uses reserved bit locations in the SERVICE FIELD to check for receive packet integrity. The remainder of the packet—the PLCP Service Data Unit (PSDU)—includes DATA at the payload data rate specified in the SIGNAL field 203.

Figure 2B:
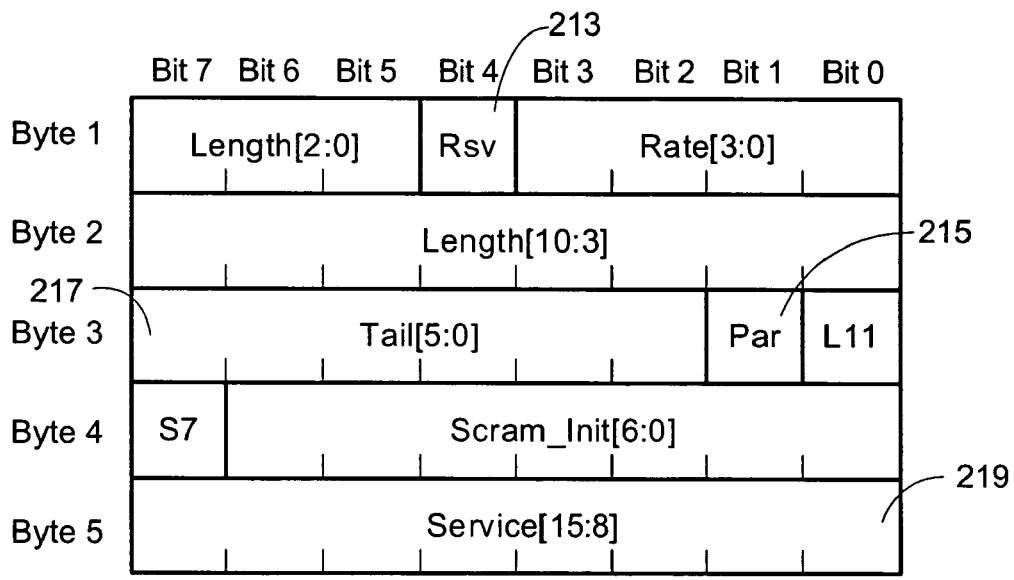
FIG. 2B shows the individual bits of the 5-byte PCLP header that conforms to the OFDM variants of the IEEE 802.11 standard.

FIG. 2B shows the individual bits of the 5-byte PCLP header. The SIGNAL field 203 includes RATE field of 4 bits denoted Rate[0] through Rate[3] that provide information on the data rate. The RATE information determines the coding rate and the modulation method used. The RATE field is followed by a reserved bit 213 that is always 0, and a 12-bit LENGTH field whose bits are denoted Length[0] through Length[11]. The LENGTH field is followed by a parity bit 215. This is followed by 6-tail bits 217 of the SIGNAL field denoted Tail[0] through Tail[5] that are reserved bit locations that should contain 0. Note that the SIGNAL field includes legal combinations. Consider the RATE field. There are 4 bits, i.e., 16 combinations, but only 8 are expected for a fully conforming packet. The LENGTH field similarly has illegal combinations, e.g., values above 1600.

The three-byte SIGNAL field 203 is followed by the two-byte SERVICE field 205 that includes 7 random scrambler initialization bits denoted Scram_Init[0] through Scram_init[6], and nine SERVICE field bits denotes Service [7] through Service[15]. The latter are reserved bit locations that should all contain value zero to conform exactly to the OFDM IEEE 802.11 standards.

A prior art receiver conforming to the OFDM variants of the IEEE 802.11 standard examines the parity bit 215 to verify received packet integrity. One bit does not offer high likelihood that a correct SIGNAL field was received. In such a prior art receiver, the receiver may continue receiving data and passing such data to the MAC processor until the MAC processor determines that an error has occurred, e.g., because the frame check sequence (FCS) field at the end of a MAC frame—a 32-bit CRC—is incorrect.

A receiver implementing one or more aspects of the invention includes a controller that checks the integrity of a received packet by checking not only whether the parity bit of the SIGNAL bit is correct, but also whether one or more other specific bits of the SIGNAL field in PLCP Header 200 in any received packet have their correct value, e.g., zero for reserved bit locations, and expected combinations for other bits. Thus, for such embodiments, a transmitter is assumed to transmit packets wherein Tail[0] through Tail[5] are 0 to conform exactly to the OFDM IEEE 802.11 standards. In another embodiment, the controller further checks the SERVICE field to determine whether or not other specific reserved bit locations of the SERVICE field 205 in PLCP Header 200 in any received packet have their required value. Thus, for such embodiments, a transmitter is assumed to transmit packets wherein service[7] through Service[1] are zero to conform exactly to the OFDM IEEE 802.11 standards. Yet another embodiment includes non-exactly conforming, but substantially conforming packets wherein parts of the PLCP header are protected by a set of error detecting bits, e.g., CRC bits, that are placed in some of the reserved SERVICE field bit locations. For one such embodiment, a transmitter is assumed to transmit packets that include an indication that a CRC is used, and wherein Service[8] through Service[15] include the CRC of some or all of the SIGNAL field. The indication used in one embodiment is that Servlce[8] through Service[15] being all 0 indicates that CRC is not being used.

Figure 3:
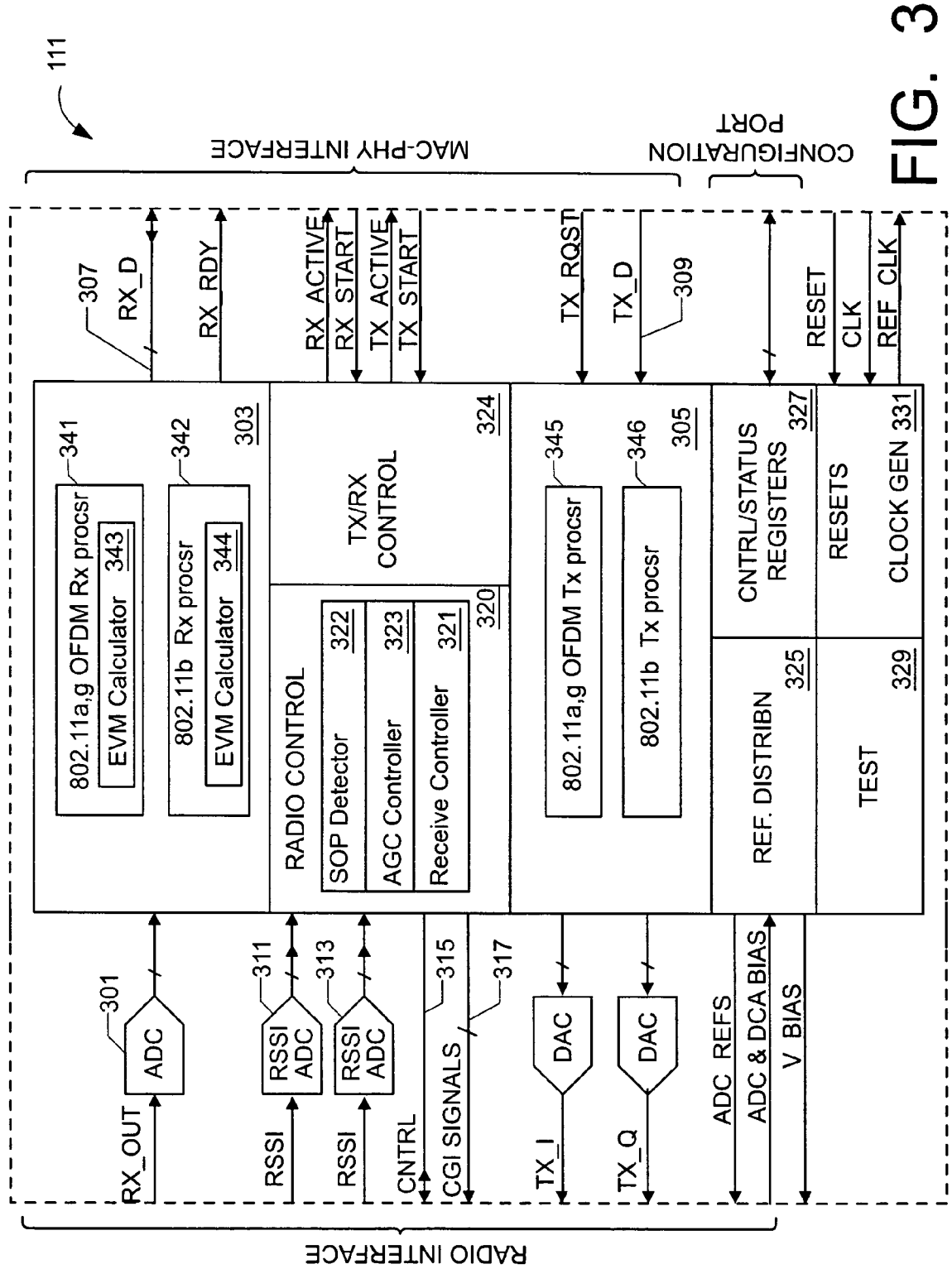
FIG. 3 shows an embodiment of the modem of the wireless network node of FIG. 1 in more detail.

FIG. 3 shows the modem 111 of FIG. 1 in more detail. The modem 111 is implemented as a single chip and includes a controller that implements the false SOP checking described herein. The modem accepts analog baseband signals. "Baseband" in this context includes low intermediate frequency signals that may need further downconversion. In one embodiment, the baseband signal is a single sideband signal from 10 to 30 MHz. An ADC 301 accepts the analog signal from a transceiver such as radio transceiver 109. The receive signal processor 303 accepts the digitized receive signals from the ADC 301 and carries out the operations needed to demodulate signals that conform to the OFDM 802.11a or 802.11g variants of the IEEE 802.11 standard, or to the DSSS/CCK 802.11b variant of the IEEE 802.11 standard. Thus, the receive signal processor 303 includes an IEEE 802.11a compliant receive signal processor 341 and an 802.11b-compliant receive signal processor 342. The combination of receive signal processors 341 and 342 provide an IEEE 802.11g compliant receive processor. The processed data output 307 from the receive signal processor 303 is coupled to an off-chip MAC processor such as MAC processor 119, generating and passing the received data of a packet to the MAC processor 119. In one embodiment, additional information also is passed on to the MAC layer processor, including information about the packet. In one embodiment, such information includes a measure of the received signal quality, e.g., in the form the error vector magnitude (EVM) of the SIGNAL field 203 of the PLCP header of a received packet. Status information also is provided to the MAC processor via registers 327 in the modem 111. In one embodiment, the PLCP header data is provided to the MAC processor via the set 327 of status registers rather than via the data interface 307.

EVM is a modulation quality metric widely used in digital RF communications systems. It is typically defined for link, and effectively for a transmitter or a receiver. The EVM is the root-mean-square (RMS) value of the error vector over time for the signal at the correct symbol time. In the case of a receiver, the correct symbol times are approximated by the decision points—the times when demodulation decisions are made. The error vector is the vector length of the difference, in the complex plane (I,Q space) between an ideal constellation point of a symbol, and the actual constellation point of a symbol at the symbol time for the signal. Some of us have invented a receiver that determines a good approximation to the EVM as an indication of the quality of the received signal. See U.S. patent application Ser. No. 10/367,010, filed Feb. 14, 2003, titled SELECTING THE DATA RATE OF A WIRELESS NETWORK LINK ACCORDING TO A MEASURE OF ERROR VECTOR MAGNITUDE, to inventors Ryan et al., Attorney/Agent Ref. No. CISCO-6489, for details of a receiver that includes such an EVM calculator. U.S. patent application Ser. No. 10/367,010 is incorporated herein be reference.

The receive signal processor 303 includes such EVM calculators 343 and 344 in each of the 802.11a,g and 802.11b receive signal processors 341 and 342, respectively. For the OFDM receive signal processor 341, the EVM calculator 343 is coupled to and accepts I,Q samples at the decision points and determines a measure of the EVM of the OFDM symbols in the packet. In one embodiment, EVM of the SIGNAL field of the PLCP header is determined. The EVM determination depends on the ideal constellation points for the particular modulation type, so in general depends on the data rate determined from the SIGNAL field. The data rate and modulation of the SIGNAL field are known.

An analog input from the transceiver 109 is sampled at 80 Ms/s by the ADC 301 and an internal IQ down-converter in processor 303 generates baseband I and Q channel outputs.

A to-be-transmitted signal 309 from the MAC processor 119 is input to a transmit signal processor 305 that performs modulation and other signal processing to provide digital I and Q signals that are converted to analog I- and Q-signals by a pair of digital-to-analog converters. These analog signals are input to the transmitter input of the transceiver 109. The transmit signal processor 305 includes an IEEE 802.11a,g compliant transmit signal processor 345 and an 802.11b-compliant transmit signal processor 346.

One aspect of the invention is the inclusion in the PLCP header of a packet for transmission information that helps protect the integrity of the header and that provides for a matching receiver to quickly determine whether or not a SOP trigger is a false SOP trigger.

In one embodiment, operation of the modem 111 is controlled and monitored by a set of control and status registers 327 that, in one embodiment, are 16-bits each and accessed via Serial Peripheral Interface (modem SPI), or in another embodiment, a parallel bus.

The receiver part of the modem is controlled by radio control block 320 that includes a start-of-packet (SOP) detector 322, an automatic gain control (AGC) controller 323 for dynamically setting the gains and the performance of the transceiver, and a Receive controller 321 coupled to the SOP detector 322 and the receive signal processor 303, and that in one embodiment implements false SOP detection operating according to one or more aspects of the invention.

The receive and transmit functions of the modem are controlled by a TX/RX control block 324 that both provides controlling the function of the modem under control of the off-chip MAC controller and that provides status signals to the off-chip MAC controller 119.

The modem 111 also includes a reference distribution subsection 325 to provide various reference currents and voltages to the transceiver, a test subsection 329, and a reset/clock generation subsystem.

The modem 111 also includes an RSSI interface accepting a pair of analog to digital converters 311 and 313 to convert analog RSSI values from different parts of the receive chain of transceiver 109 to digital signals for the radio control section 320 that implements AGC and SOP.

The modem 111 also includes a modem gain control interface in radio control 320 that outputs gain parameters, e.g., in the form of sets of gain control bits to a matching gain control interface in a radio receiver such as that of transceiver 109. In one embodiment, the modem gain control interface also provides a mechanism for controlling the transmit power level of a radio transmitter connected to the modem by selecting from one of a set of configurations for the power amplifier of the transmitter.

One aspect of the invention is enabling rapid false start-of-packet detection by the transmit processor setting particular bits of the PLCP header that are reserved to 0 and the receive processor ascertaining whether indeed such reserved bit locations are zero. Another aspect of the invention is checking that only correct combinations exist for at least some of the bits of a received header.

Another aspect of the invention is further protecting the integrity of the header, e.g., the SIGNAL field by including in a to-be-transmitted packet an error detection code such as a cyclic redundancy code to provide more than the single parity bit to protect the SIGNAL field. Another aspect of the invention is determining whether such encoding is included in a packet, and if yet, ascertaining whether or not an error occurred in the SIGNAL field by checking the error detecting code. When such coding is included, the packet no longer strictly conforms to the IEEE 802.11 standard, but rather "substantially conforms" to the standard.

In one embodiment, the transmit processor such as the OFDM transmit processor 345 includes a processor to calculate an 8-bit CRC of data from the SIGNAL field and place the resulting CRC in the unused part of the SERVICE field, in particular, into the eight SERVICE field bits of the fifth PLCP header byte (Service [15:8]) that should all be zero to conform to the OFDM IEEE 802.11 standards. One version calculates the CRC of the 17 bits that make up the LENGTH, RATE, and reserved bit part of the SIGNAL field. The CRC calculation uses the generator polynomial $x^8+x^2+x^1+1$. Such a CRC detects all single-bit and double-bit errors, and all errors resulting in odd parity, and also detects all burst errors less than or equal to 8-bits in length.

The control/status registers 327 of modem 111 (FIG. 3) include a settable parameter that indicates whether or not the OFDM transmit processor 345 is to include calculating the CRC and placing it into the PLCP header. If it is indicated that the transmitter is to send "exactly standard" packets, then the unused SERVICE bits are set to 0.

Operation of the receive chain is now described in more detail.

Initially, the AGC controller 323 sets a default gain and waits for a packet to arrive, as signaled by a start-of-packet (SOP) event detected by the start-of-packet detector 322 in radio controller 321. The default gain setting sets the gains of each section to allow packets having a broad range of signal strengths to be detected reliably. Initially, the start-of-packet (SOP) detector 322 waits for a start event such as a rise in one or more of the RSSI values to indicate a possible start of packet. One embodiment uses a method similar to that disclosed in U.S. patent application Ser. No. 10/095,668 to Ryan et al., filed Mar. 8, 2002, and titled AUTOMATIC GAIN CONTROL AND LOW-POWER START-OF-PACKET DETECTION FOR A WIRELESS LAN RECEIVER, incorporated herein by reference. Depending on the SOP detection method, the SOP event nominally occurs during the first 1.6 μs of an OFDM packet.

Once the initial SOP event occurs, the AGC controller 323 sets the gains of the receive chain in the transceiver according to the RSSI values to bring the analog outputs to be within the range of the ADCs. A further AGC stage uses digitized signal values to further set the gain of the receiver. Once the ADCs are operating, the SOP detector further refines the SOP event timing using correlators that correlate the digital signal values with expected short symbols and with expected long symbols that would be present in the preamble of a packet that conforms to the OFDM variants of the IEEE 802.11 standard.

The modem 111 now continues to process the data part of the packet, starting the with PLCP header 200 in the case of an OFDM packet.

Operation of an embodiment of the AGC controller uses a finite state machine (FSM) and is described in more detail in U.S. patent application Ser. No. 10/622,175 filed Jul. 17, 2003 to inventors Adams, et al., titled ADAPTIVE AGC IN A WIRELESS NETWORK RECEIVER, Attorney/Agent Ref. No. CISCO-7343. Such U.S. patent application Ser. No. 10/622,175 is incorporated herein by reference.

After the SOP event, indicated by a logic bit we call sop_boundary being 1, the integrity of the SOP trigger is ascertained by the receive controller that in one embodiment is implemented by finite state machine we call the receive FSM. An alternate embodiment uses a processing system.

Figure 4:
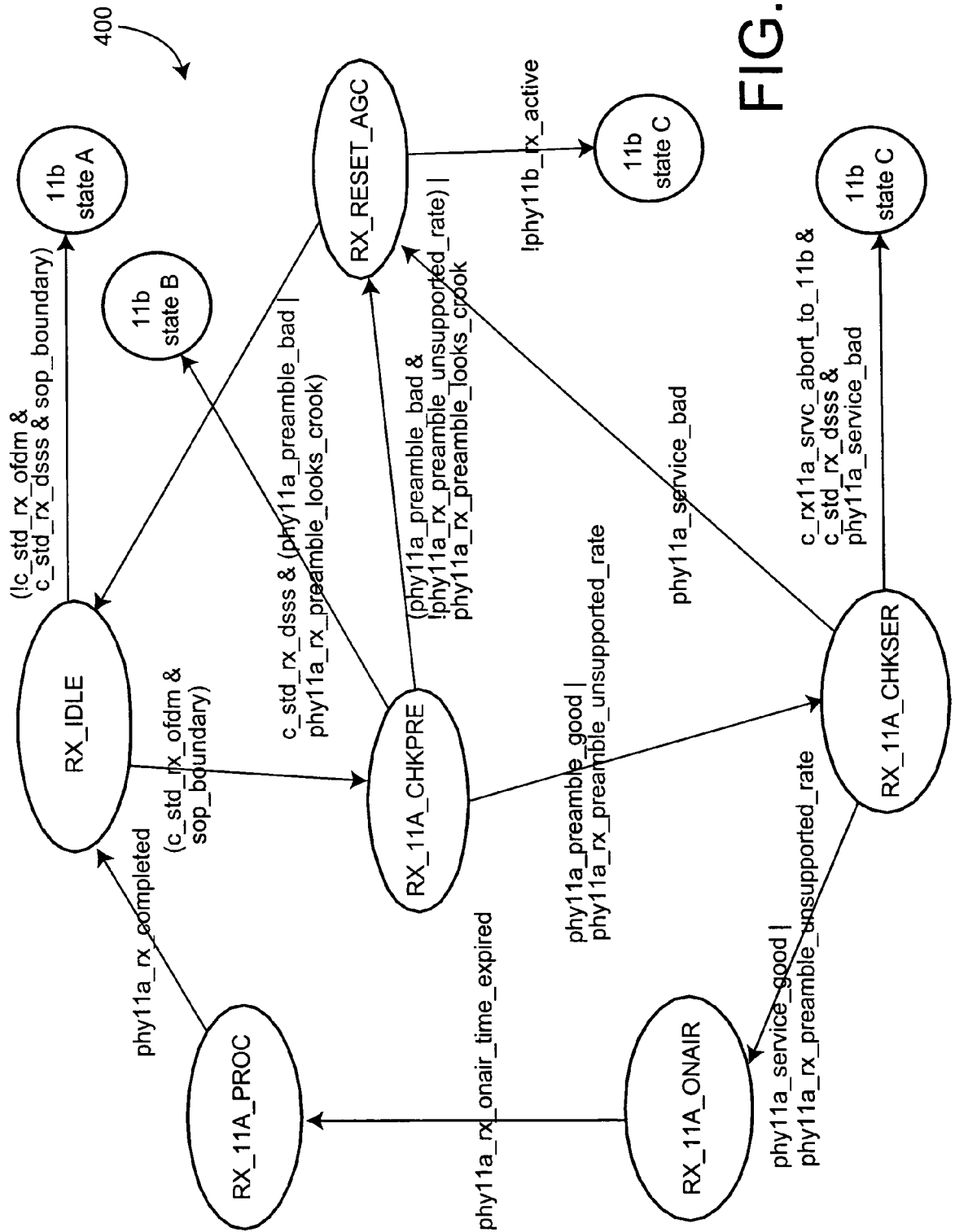
FIG. 4 shows a state transition diagram for one embodiment of the OFDM packet processing part of a receive finite state machine that implements early false SOP trigger detection.
Figure 5:
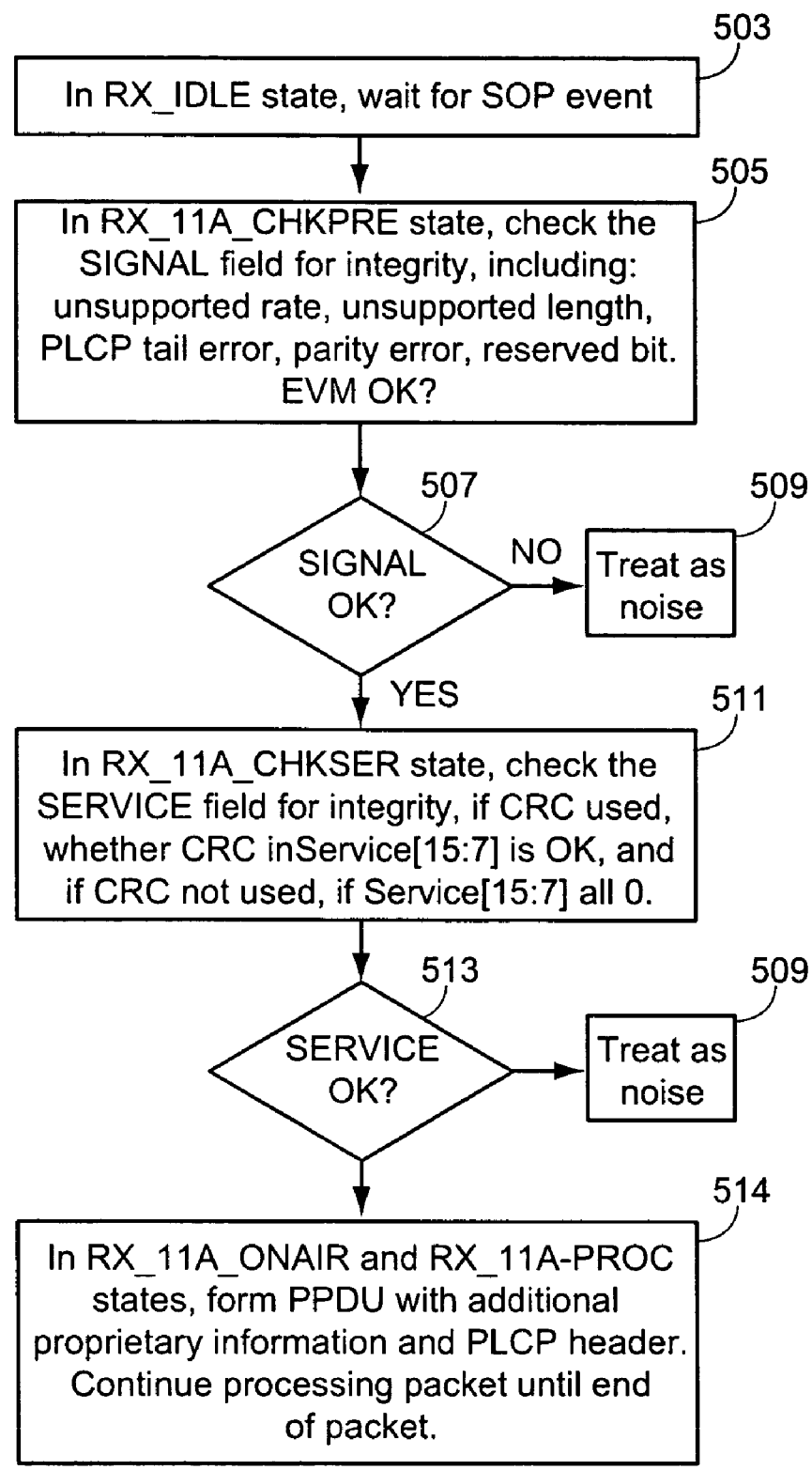
FIG. 5 shows a flow chart of an embodiment of a method of checking whether or not a SOP indication is a false SOP indication, and follows the state transition diagram of FIG. 4.

FIG. 4 shows a state transition diagram 400 for one embodiment of the OFDM packet processing part of the receive FSM. FIG. 5 shows the flow chart of an embodiment of a method of checking whether or not a SOP indication is a false SOP indication, and follows the state transition diagram 400.

The receive controller waits (step 503) for an SOP boundary indication in a wait state called the RX_IDLE state in which the AGC controller 323 is armed after the gain is set to the default gain and also waiting for a start of packet event (SOP) from the SOP detector 322. The RX_IDLE state is vacated when there is a SOP time determined, as indicated by a binary variable called sop_boundary.

In FIG. 4, variables that start with c_indicate configuration registers of set 327. Thus, c_std_rx_odfm indicates that the modem is configured to receive ODFM packets conforming to the IEEE 802.11a and 802.11 g standards, and c_std_rx_dsss indicates that the modem is configured to receive packets conforming to the IEEE 802.11b standard. Thus, FIG. 4 shows several transitions to states for processing IEEE 802.11b conforming packets indicated as 11b state A, 11b state B, . . . , 11b State D. For example, from the RX_IDLE state, sop_boundary being true, i.e., equal to 1 and c_std_rx_dsss true causes a transition to a IEEE 802.11b processing state for starting to process the packet. Such IEEE 802.11b-related states are not discussed here. How to modify the inventive aspects of the invention for processing non-ODFM packets is left to the reader and would be clear to those in the art.

For the OFDM case of interest, sop_boundary true (and c_std_rx_ofdm true) causes a transition to a state called RX_11A_CHKPRE in which step 505 of checking the SIGNAL field of the PLCP header is carried out. In one embodiment, in addition to the parity bit 215 being checked for correctness, one or more of the reserved bit 213 and any or all of the tail bits 217 are checked to ensure that they are 0. In one embodiment, the RATE and SIGNAL bits are further checked for illegal combinations. In the embodiment that includes uses a modem that provides a measure of the received signal quality, the received signal quality of the SIGNAL field part of the signal is also checked to ensure that it is above a preset threshold. In one embodiment, the modem 111 includes an EVM calculator 343 to provide the EVM, and the EVM of the SIGNAL field is also checked to ensure that it is above a preset threshold.

If any of these indicate that there has been an error (test step 507), indicated by setting true a binary variable denoted phy11$a$_preamble_bad and if the rate is a supported rate, indicated by the receive controller 321 setting a variable called phy_11$a$_rx_preamble_unsupported_rate as false, the state of the receive controller 321 moves to a state called the RX_RESET_AGC state in which step 509 is carried out, namely treating the packet as noise, including resetting the AGC controller. As a result of step 509, the MAC processor, for example, will backoff using a distributed coordination function interframe space (DIFS). The receive controller 321 also moves from the RX_11A_CHKPRE to the RX_RESET_AGC state if there is some indication that the preamble was bad. In one embodiment, this occurs if there is signal loss during the preamble, or of either of the correlator for the short symbol or the correlator for the long symbol lose their expected output. When any of these conditions occur, the SOP detector sets a binary variable phy11$a$_rx_preamble_looks_crook to true, and this in turn causes the receive controller 321 to move to the RX_RESET_AGC state.

Note that under some conditions, step 507 may conclude that this is a packet that conforms to the IEEE 802.11b standard, in which case the state moves to one of the 802.11b states.

If, on the other hand, steps 505 and 507 indicate that the SIGNAL field passed its tests (phy_11$a$_rx_preamble_good is true), or the rate is unsupported as indicated by phy_11$a$_rx_preamble_unsupported_rate being true, the receive controller 321 moves to a state called Rx_11A_CHKSER in which a step 511 of checking the SERVICE field is carried out. Note that the SERVICE field is modulated at a rate indicated by the SIGNAL field.

One aspect of the invention is further protecting the integrity of the header, e.g., the SIGNAL field by including in a to-be-transmitted packet an error detection code such as a CRC to provide more than the single parity bit to protect the SIGNAL field. The receive processor further can determine whether or not such error detecting encoding is used. Another aspect of the invention is determining whether such encoding is included in a packet, and if yes, ascertaining whether or not an error occurred in the SIGNAL field by checking the error detecting code.

Thus, referring again to FIGS. 4 and 5, in state Rx_11A_CHRKSER (FIG. 4), step 511 includes checking the SERVICE field for integrity. The method first ascertains whether or not a CRC is used to protect the SIGNAL field. If yes, it is ascertained whether or not the CRC in Service [15:8] is correct to indicate if the packet's SERVICE field passes the test of the RX_11A_CHKSER state. IF CRC is not being used, it is ascertained whether or not the service bits Service [15:7] are all 0 as required to strictly conform to the IEEE 802.11 OFDM standard to indicate if the packet's SERVICE field passes the test of the RX_11A_CHRKSER state.

If the packet's SERVICE field passes the test (step 513), indicated by setting a variable called phy11$a$_service_good true or if phy11$a$_rx_preamble_unspported_rate is true, then the state of the receive controller 321 moves to state RX_11A_ONAIR until a time is expired and then on to state RX_11A_PROC where the rest of the packet is processed. Processing continues until the end of packet at which time the state moves back to the RX_IDLE state. The processing includes passing data to the MAC processor for further processing according to the appropriate MAC protocol.

If on the other hand the packet's SERVICE field fails the test (step 513), the receive controller 321 sets a variable called phy11$a$_service_bad as true and moves the state to the RX_RESET_AGC state in which step 509 is carried out, namely treating the packet as noise, including resetting the AGC controller.

In a first alternate embodiment, rather than an error detecting code such as a CRC being used to protect the SIGNAL field, an error correcting code is used that can correct for one or more bit errors in the SIGNAL field. If 8-bits are used for as additional check bits for encoding 17 bits of the SIGNAL field, i.e. a total of 25 bits are used to transmit 17 bits of information, or, not including the reserved bit, 8-bits are used for the check bits encoding 16 bits of the SIGNAL field, i.e. a total of 24 bits are used to transmit 16-bits, error correction of at least one bit error is possible. There are many textbooks that describe implementing error correcting codes. See for example, *The Art of Error Correcting Coding* by Robert H. Morelos-Zaragoza, John Wiley & Sons, 2002 ISBN: 0471495816. See also the Web sites http://www.eccpage.com/ and http://the-art-of-ecc.com/ for a discussion of various practical error correcting codes, including computer programs to carry out error correcting codes. Including error correcting allows for detecting of highly degraded signals. This would allow a station using such to stay in time synchronization with the network as such a station can then reliably discriminate between a false packet, and a highly distorted (and not necessarily decodable) real packet with a calculable time on the medium.

Note that failing the SERVICE field test in the case that no error correcting or detecting is used does not indicate that there was necessarily an error in the SIGNAL field, but does indicate that there likely was an error in the payload part that is modulated by a method and at a rate indicated by RATE.

The processing of step 514 in the TX_11A_PROC state includes forming the data for the MAC processor 119. One embodiment of the modem 111 operates in two modes we call PSDU (for PLCP Service Data Unit) mode and PPDU (for PLCP Protocol Data Unit) mode, respectively. In PSDU mode, only packet payload data is transferred to the MAC processor 119. All receive packet header information is available to the MAC processor 119 in the status registers 327. In PPDU mode, the PPDU data, such as the PLCP header data, is also sent to the MAC processor 119, and such data is sent to the MAC processor once it is decoded.

Figure 6:
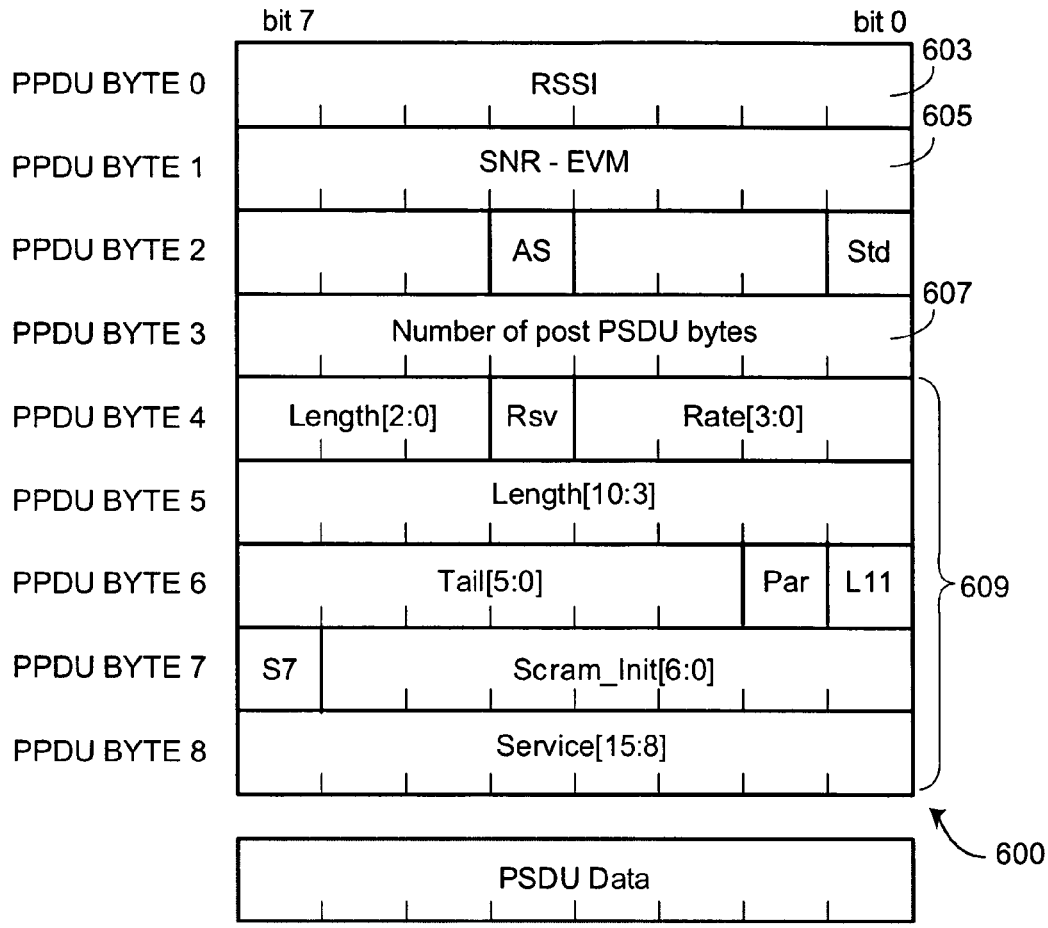
FIG. 6 shows the order of data transmitted to a MAC processor in the case that data received is OFDM data and that PPDU (for PLCP Protocol Data Unit) mode is enabled, according to one aspect of the invention.

FIG. 6 shows the order of data transmitted to the MAC processor 119 in the case that the data is OFDM data and that PPDU mode is enabled. In one embodiment, a total of nine bytes 400 are sent before the PSDU data. The byte 603 provides the received power at the receiver for the packet, in particular, the received signal strength indication—the RSSI—at the receiver of transceiver 109 for the packet. The second byte 605 provides a measure of the signal quality for the SIGNAL field. In one embodiment, this is the EVM calculated by EVM calculator 343. The next byte contains an indication of the antenna used, the standard (802.11a,g OFDM or 802.11b DSSS/CCK), and other information related to the DSSS/CCK case. One embodiment also provides for sending some additional information after the PSDU data, e.g., for debugging. The next (fourth) byte 407 indicates to the MAC the number of post PSDU bytes that are to be included. This is followed by the five-byte PLCP header itself 409 (for the OFDM case). The PSDU data follows.

When the PPDU mode is used, the first seven bytes are first provided to the MAC processor. This includes the SIGNAL field. After the modem determines the rate, etc., the last two bytes (SERVICE) are provided to the MAC followed by the PSDU data.

In one alternate embodiment, part of the determination of whether or not the trigger is a false trigger is carried out partly in the modem 111, and partly in the MAC processor 119. One particular embodiment, step 505 (the RX_11A_CHKPRE state) does not include checking the EVM. Rather, using PPDU mode as an example, the first 7-bytes passed to the MAC processor include the EVM of the SIGNAL field. The MAC processor ascertains whether or not the received signal quality as indicated by the EVM is too low. If EVM is below a settable threshold, the MAC processor assumes a false trigger.

Figure 7:
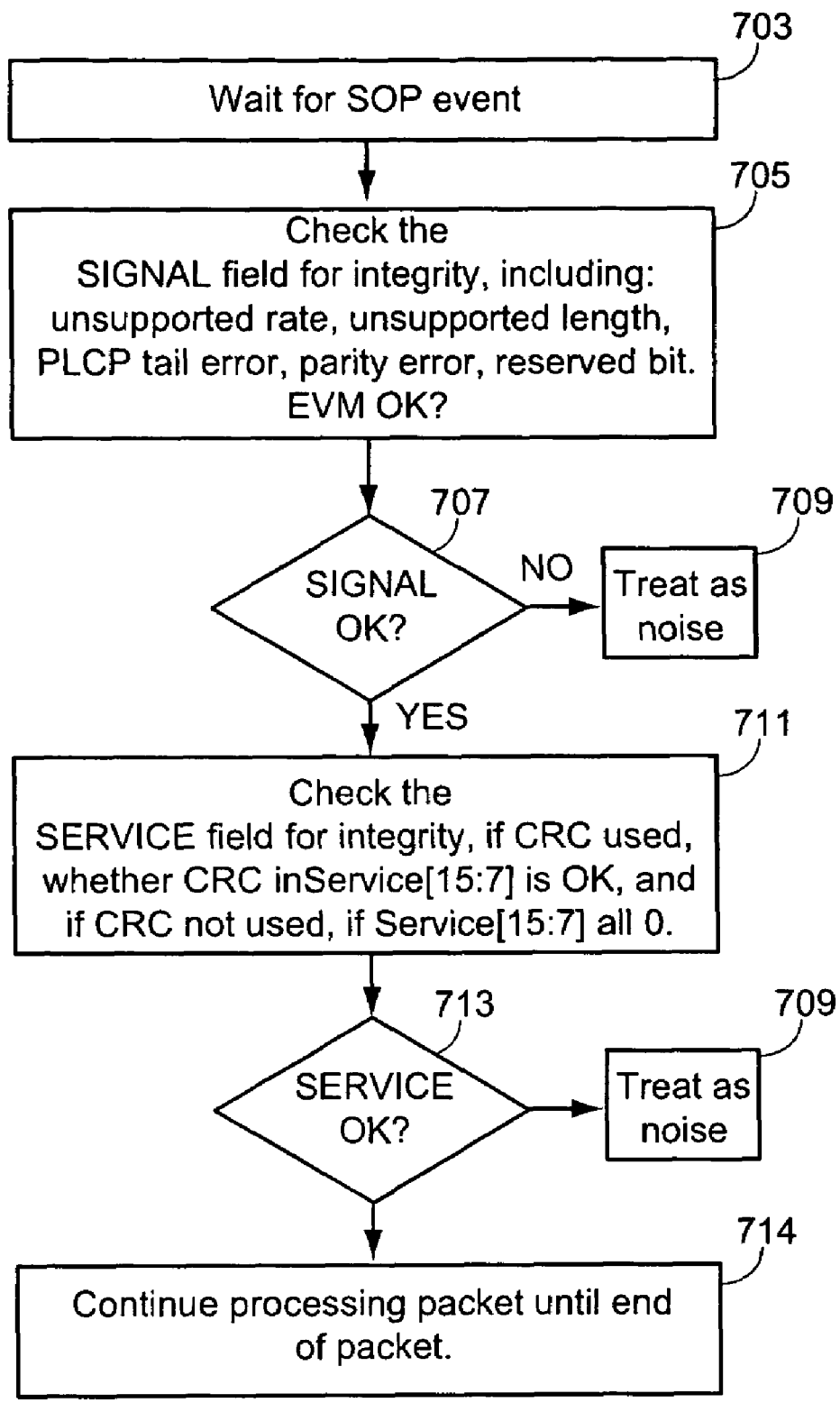
FIG. 7 shows a flow chart of an embodiment of method for checking whether or not an SOP is a false SOP trigger carried out by a MAC processor.

In another alternate embodiment, all the processing to determine whether or not an SOP is a false SOP trigger is carried out by the MAC processor rather than the receive signal processor. FIG. 7 shows a flow chart of such an embodiment. In 703, the MAC waits for indication that SIGNAL field data is available, e.g., that in PPDU mode, the modem is ready for the MAC to accept the seven initial bytes, or in PSDU mode, that the registers in register set 327 contain the SIGNAL part of the PLCP header. Once an indication is made to the MAC processor, in step 705, for PSDU mode, the MAC processor checks the SIGNAL field data in the respective registers of the register set 327 of the modem for integrity, and in PPDU mode, the MAC processor checks the SIGNAL field for integrity by checking for reserved bit locations having their preset values, and in one embodiment, also ensuring that RATE and/or SIGNAL do not have illegal combinations. If SIGNAL fails the test (707), the MAC processor treats the data as noise (709). If SIGNAL passes the test, and once the SERVICE field data is available to the MAC processor, in step 711, the MAC processor checks the SERVICE field for integrity, as described above. If the SERVICE field passes the test (713), the MAC processor continues to receive and process the PSDU data.

Note that yet another alternate embodiment in which the ascertaining whether or not an SOP trigger is a false trigger is carried out in the MAC processor, the MAC processor accepts the first three bytes of the PLCP header from the PHY processor as soon as such data is available. The MAC processor then examines certain bits of the SIGNAL field to check whether or not the trigger is a false trigger. If not, the processing continues, and the modem passes the next two bytes of the PLCP header to the MAC processor. The MAC processor now proceeds to further ascertain if the SOP trigger is likely to be a false SOP trigger by, in one embodiment in which CRC or a similar error detecting code may be used, first ascertaining if CRC is used to protect the SIGNAL field of the particular received packet, and if so, checking the CRC, and if not, checking certain bits of the SERVICE field to make sure they are set to 0. In another version in which no provision is made for error correction, the unused SERVICE field bits need all be 0 to indicate that the SOP trigger is not a false trigger.

While one embodiment uses the EVM of the SIGNAL field as a measure of the signal quality with which to ascertain whether or not an SOP is a false SOP trigger, alternate embodiments use a different measure for the signal quality, such as alternate measures of signal-to-noise. One alternate embodiment used with a receiver in transceiver 109 that includes a filter in the receive signal path 106 and that provides both a pre-filter measure of signal strength and a post-filter measure of signal strength to the modem 111, uses a measure of signal to adjacent-channel-interference ratio. Comparing such pre- and post-filter measures of signal strength provides a measure of the amount of filtering by the filter, and this in turn provides a measure of adjacent channel interference. See above-mentioned incorporated-by-reference U.S. patent application Ser. No. 10/622,175 filed Jul. 17, 2003 to inventors Adams, et al., titled ADAPTIVE AGC IN A WIRELESS NETWORK RECEIVER for details on how such measures are calibrated and for how providing such pre- and post-filter measures of signal strength provides improved AGC.

Note that while one embodiment is described in which additional information such as RSSI and EVM is provided to the MAC processor in one particular format, the invention is not at all restricted to such formats. In another version in which no provision is made for error correction, some of the unused SERVICE field bits may be used to send to the MAC processor an indication of the received signal strength or a measure of signal quality such as EVM.

While an embodiment has been described for operation with a WLAN receiver with RF frequencies in the 5 GHz range and 2.4 GHz range (the 802.11a and 802.11g variants of the IEEE 802.11 standard), the invention may be embodied in receivers and transceivers operating in other RF frequency ranges, and in a method or apparatus for early false SOP trigger detection. Furthermore, while a receiver embodiment for operation conforming to the IEEE 802.11 OFDM standards has been described, the invention may be embodied in receivers conforming to other standards and for other applications, including, for example other WLAN standards and other wireless standards where it is required to detect false SOP triggers early. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

Note that the invention is usable in a node of a wireless network. The node may implement an access point, a client station, a bridge, or any other network entity that includes wirelessly receiving packets that exactly or substantially conform to a standard supported by the network.

While FIG. 1 shows an embodiment of a wireless node in which the transceiver is one chip, the modem is another, and the MAC processor is yet another chip, the invention is not limited to any such configuration. The combination of a transceiver and modem may be implemented in a single chip, the modem and the MAC processor may be implemented as one chip, the transceiver, modem, and MAC processor may be implemented as one chip, some of the elements may be discrete, and so forth.

Figure 8:
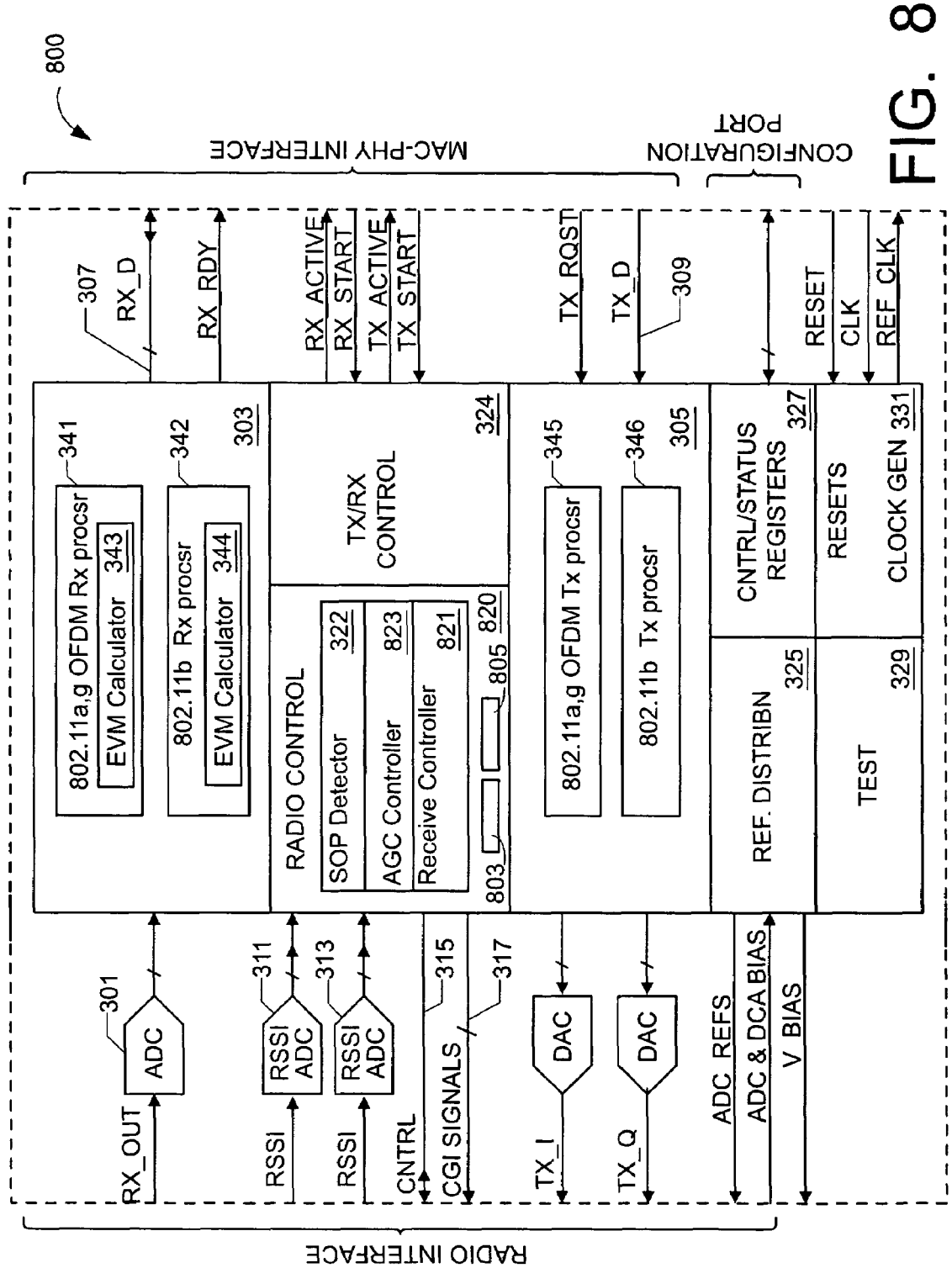
FIG. 8 shows an alternate embodiment of a modem for the wireless network node of FIG. 1 that includes a processing system and a memory.

While one embodiment of checking the integrity of the SOP trigger uses the receive controller that in one embodiment is implemented by finite state machine, in another embodiment, checking the integrity of the SOP trigger uses a controller that includes a processing system and a memory, with an embodiment of the method (FIG. 5) implemented by instructions executed by one or more processors of the processing system. FIG. 8 shows an alternate modem embodiment 800 in which the radio control module 820 includes a processor 802 coupled to a memory 805 that contains the instructions to implement the method described herein and carrier out by the receive controller 821. The processor in such an embodiment may also be used to execute instruction in the memory to implement other features of the modem 800, such as the action of the AGC controller 823.

Note that while one embodiment checks all of Service [8] through Service [15] to see if they are 0 as a test for integrity and/or a test to ascertain whether error detecting is used, in an alternate embodiment, a designer may choose to select fewer of these bits to check for integrity.

Note that while one embodiment includes a check to see if the rate is unsupported, and continues processing in such a case (if it can), other embodiments do not include this check.

Thus, embodiments of the methods described herein may be in the form of computer programs, e.g., code segments that each executes on a processing system, e.g., one or more processors that are part of a modem. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer-readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. In a receiving node of a wireless network that is able to receive packets that exactly or substantially conform to a wireless network standard, each packet including a header that includes, in the case that the packet exactly conforms to the standard, reserved bit locations set to correct values and reserved bit locations set to one of a plurality of correct combinations, a method comprising:

receiving a start-of-packet (SOP) trigger that indicates that a packet may have been received;

checking one or more bits in respective reserved bit
locations in the header to determine whether or not they
have their respective correct values, continuing to process the packet in the case that the
checking indicates that the checked bits have their
respective correct values.

2. A method as recited in claim 1, wherein the header of a packet receivable by the node includes a first field modulated at a known rate and including one or more reserved bit locations, and a second field modulated at a data rate indicated in the first field, the checking including:

processing the first field and checking one or more bits in
the first field to determine whether or not they have
their respective correct values; and if the checked bits of the first field have their respective
correct values, checking the second field for integrity.

3. A method as recited in claim 2, wherein the checking one or more bits in the first field to determine whether or not they have their respective correct values includes checking one or more reserved bit locations of the first field to determine whether or not they contain their respective correct values.

4. A method as recited in claim 2, wherein the checking one or more bits in the first field to determine whether or not they have their respective correct values includes checking whether or not one or more combinations of bits in the first field are unexpected.

5. A method as recited in claim 2, wherein the packet optionally includes an indication of whether or not reserved bit locations of the second field include an error detecting code formed from at least part of the first field, and wherein the checking the second field for integrity includes:

checking the indication to ascertain whether or not
reserved bit locations of the second field include an
error detecting code;

if it is ascertained that such an error detecting code is
included, checking the included error correcting code;
and if it is ascertained that an error detecting code is not
included, checking one or more reserved bit locations
in the second field to determine whether or not they
have their respective correct values.

6. A method as recited in claim 2, wherein the checking the second field for integrity includes:

checking one or more reserved bit locations in the second
field to determine whether or not they have their
respective preset values.

7. A method as recited in claim 2, wherein the receiving node is able to receive packets that conform to one or more of the IEEE 802.11 OFDM standards, wherein the first field is a SIGNAL field and wherein the second field is a SERVICE field.

8. A method as recited in claim 2, wherein the receiving node includes a PHY processor and a MAC processor; and wherein the checking of the one or more bits in the first field occurs in the PHY processor.

9. A method as recited in claim 2, wherein the receiving node includes a PHY processor and a MAC processor; and wherein processing of the first field is by the PHY processor and includes providing the processed data of the first field to the MAC processor, and wherein the checking of the one or more bits in the first field includes the MAC processor accepting the processed data of the first field and checking the one or more bits in the first field.

10. A method as recited in claim 2, further comprising:

providing a measure of the received signal quality; and checking whether the received signal quality measure is
above a set level, such that the SOP trigger is ascertained to be a false trigger in the case that the received signal quality measure is not above the set level.

11. A method as recited in claim 10, wherein the measure of the received signal quality is a measure of the signal to adjacent-channel-interference ratio.

12. A method as recited in claim 10, wherein the measure of the received signal quality is a measure of the error vector magnitude (EVM).

13. A method as recited in claim 12, wherein the receiving node includes a PHY processor and a MAC processor; and wherein the PHY processor provides a measure of the EVM to the MAC processor, such that the checking of whether the received EVM is above a set level includes the MAC processor accepting the EVM measure from the PHY processor and checking whether accepted received EVM is above the set level.

14. A PHY processor of a node of a wireless network to wirelessly receive packets that exactly or substantially conform to a wireless network standard, each packet including a header that includes, in the case that the packet exactly conforms to the standard, reserved bit locations set to correct values and bits set to one of a plurality of correct combinations, the receiving node including a MAC processor having an input coupled to the output of the PHY processor, the header of a packet receivable by the node including a first field modulated at a known rate and including one or more reserved first field bit locations, and a second field modulated at a data rate indicated in the first field, the PHY processor comprising:

an SOP detector to provide a start-of-packet (SOP) trigger
that indicates that a packet may have been received;

a receive signal processor to process modulated packet
data and provide the processed data to the MAC
processor; and a receive controller coupled to the SOP detector and the
receive signal processor, the receive controller configured to:

accept an SOP trigger from the SOP detector that
indicates that a packet may have been received;

after such an SOP trigger is accepted, check one or
more bits in the header to determine whether or not
they have their respective correct values, wherein the checking by the receive controller includes:

after the receive Processor processes the first field, checking one or more bits in the first field to determine
whether or not they have their respective correct values,
including checking one or more reserved first field bit
locations to determine whether or not they have their
respective preset values; and if the checked bits of the first field have their respective
correct values, checking the second field for integrity, such that the checking indicates whether or not the SOP trigger is a false SOP trigger.

15. A PHY processor of a node of a wireless network to wirelessly receive packets that exactly or substantially conform to a wireless network standard, each packet including a header that includes, in the case that the packet exactly conforms to the standard, reserved bit locations set to correct values and bits set to one of a plurality of correct combinations, the receiving node including a MAC processor having an input coupled to the output of the PHY processor, the header of a packet receivable by the node including a first field modulated at a known rate and including one or more reserved first field bit locations, and a second field modulated at a data rate indicated in the first field, the packet optionally including an indication of whether or not reserved bit locations of the second field include an error detecting code formed from at least part of the first field, the PHY processor comprising:

an SOP detector to provide a start-of-packet (SOP) trigger that indicates that a packet may have been received;

a receive signal processor to process modulated packet data and provide the processed data to the MAC processor; and a receive controller coupled to the SOP detector and the receive signal processor, the receive controller configured to:
accept an SOP trigger from the SOP detector that indicates that a packet may have been received;
after such an SOP trigger is accepted, check one or more bits in the header to determine whether or not they have their respective correct values, wherein the checking by the receive controller includes:
after the receive processor processes the first field, checking one or more bits in the first field to determine whether or not they have their respective correct values; and
if the checked bits of the first field have their respective correct values, checking the second field for integrity including:
checking the indication to ascertain whether or not reserved bit locations of the second field include an error detecting code;
if it is ascertained that such an error detecting code is included, checking the included error correcting code; and
if it is ascertained that an error detecting code is not included, checking one or more reserved bit locations in the second field to determine whether or not they have their respective correct values, such that the checking indicates whether or not the SOP trigger is a false SOP trigger,
checking the indication to ascertain whether or not reserved bit locations of the second field include an error detecting code;
if it is ascertained that such an error detecting code is included, checking the included error correcting code; and
if it is ascertained that an error detecting code is not included, checking one or more reserved bit locations in the second field to determine whether or not they have their respective correct values.

16. A PHY processor of a node of a wireless network to wirelessly receive packets that exactly or substantially conform to a wireless network standard, each packet including a header that includes, in the case that the packet exactly conforms to the standard, reserved bit locations set to correct values and bits set to one of a plurality of correct combinations, the receiving node including a MAC processor having an input coupled to the output of the PHY processor, the header of a packet receivable by the node including a first field modulated at a known rate and including one or more reserved first field bit locations, and a second field modulated at a data rate indicated in the first field, the PHY processor comprising:

an SOP detector to provide a start-of-packet (SOP) trigger that indicates that a packet may have been received;

a receive signal processor to process modulated packet data and provide the processed data to the MAC processor; and a receive controller coupled to the SOP detector and the receive signal processor, the receive controller configured to:
accept an SOP trigger from the SOP detector that indicates that a packet may have been received;
after such an SOP trigger is accepted, check one or more bits in the header to determine whether or not they have their respective correct values, wherein the checking by the receive controller includes:
after the receive processor processes the first field, checking one or more bits in the first field to determine whether or not they have their respective correct values; and
if the checked bits of the first field have their respective correct values, checking the second field for integrity, including checking one or more reserved bit locations in the second field to determine whether or not they have their respective preset values, such that the checking indicates whether or not the SOP trigger is a false SOP trigger.

17. A PHY processor of a node of a wireless network to wirelessly receive packets that exactly or substantially conform to a wireless network standard, each packet including a header that includes, in the case that the packet exactly conforms to the standard, reserved bit locations set to correct values and bits set to one of a plurality of correct combinations, the receiving node including a MAC processor having an input coupled to the output of the PHY processor, the header of a packet receivable by the node including a first field modulated at a known rate and including one or more reserved first field bit locations, and a second field modulated at a data rate indicated in the first field, the PHY processor comprising:

an SOP detector to provide a start-of-packet (SOP) trigger that indicates that a packet may have been received;

a receive signal processor to process modulated packet data and provide the processed data to the MAC processor;

a signal quality calculator to provide a measure of the received signal quality; and a receive controller coupled to the SOP detector and the receive signal processor, the receive controller configured to:
accept an SOP trigger from the SOP detector that indicates that a Packet may have been received;
after such an SOP trigger is accepted, check one or more bits in the header to determine whether or not they have their respective correct values;
accept the received signal quality measure from the signal quality calculator; and
check whether the received signal quality measure is above a set level, wherein the checking by the receive controller includes:
after the receive processor processes the first field, checking one or more bits in the first field to determine whether or not they have their respective correct values; and
if the checked bits of the first field have their respective correct values, checking the second field for integrity, such that the checking indicates whether or not the SOP trigger is a false SOP trigger, and such that the SOP trigger is ascertained to be a false trigger in the case that the received signal quality measure is not above the set level.

18. A PHY processor as recited in claim 17, wherein the signal quality calculator is an error vector magnitude (EVM) calculator to provide a measure of the error vector magnitude (EVM).

19. A control means for inclusion in a receiving node of a wireless network that is able to receive packets that exactly or substantially conform to a wireless network standard, each packet including a header that includes, in the case that the packet exactly conforms to the standard, reserved bit locations set to correct values, and bits set to one of a plurality of correct combinations, the header of a packet receivable by the node including a first field modulated at a known rate and including one or more reserved bit locations, and a second field modulated at a data rate indicated in the first field, a control means comprising:

means for receiving a start-of-packet (SOP) trigger that indicates that a packet may have been received;

means for checking one or more bits in the header to determine whether or not they have their respective correct values, the means for checking including:

means for checking one or more bits in the first field to determine whether or not they have their respective correct values; and means for checking the second field for integrity if the checked bits of the first field have their respective correct values; and means for continuing to process the packet in the case that the checking indicates that the checked bits have their respective correct values, wherein the packet optionally includes an indication of whether or not reserved bit locations of the second field include an error detecting code formed from at least part of the first field, and wherein the means for checking the second field for integrity includes:

means for checking the indication to ascertain whether or not reserved bit locations of the second field include an error detecting code;

means for checking the included error correcting code if it is ascertained that such an error detecting code is included; and means for checking one or more reserved bit locations in the second field to determine whether or not they have their respective correct values if it is ascertained that an error detecting code is not included.

20. A control means for inclusion in a receiving node of a wireless network that is able to receive packets that exactly or substantially conform to a wireless network standard, each packet including a header that includes, in the case that the packet exactly conforms to the standard, reserved bit locations set to correct values, and bits set to one of a plurality of correct combinations, the header of a packet receivable by the node including a first field modulated at a known rate and including one or more reserved bit locations, and a second field modulated at a data rate indicated in the first field, a control means comprising:

means for receiving a start-of-packet (SOP) trigger that indicates that a Packet may have been received;

means for checking one or more bits in the header to determine whether or not they have their respective correct values, the means for checking including:

means for checking one or more bits in the first field to determine whether or not they have their respective correct values; and means for checking the second field for integrity if the checked bits of the first field have their respective correct values; and means for continuing to process the packet in the case that the checking indicates that the checked bits have their respective correct values, wherein the means for checking the second field for integrity includes:

means for checking one or more reserved bit locations in the second field to determine whether or not they have their respective preset values.

21. A control means for inclusion in a receiving node of a wireless network that is able to receive packets that exactly or substantially conform to a wireless network standard, each packet including a header that includes, in the case that the packet exactly conforms to the standard, reserved bit locations set to correct values, and bits set to one of a plurality of correct combinations, the header of a packet receivable by the node including a first field modulated at a known rate and including one or more reserved bit locations, and a second field modulated at a data rate indicated in the first field, a control means comprising:

means for receiving a start-of-packet (SOP) trigger that indicates that a packet may have been received;

means for checking one or more bits in the header to determine whether or not they have their respective correct values, the means for checking including:

means for checking one or more bits in the first field to determine whether or not they have their respective correct values; and means for checking the second field for integrity if the checked bits of the first field have their respective correct values;

means for continuing to process the packet in the case that the checking indicates that the checked bits have their respective correct values:

means for providing a measure of the received signal quality; and means for checking whether the received signal quality measure is above a set level, such that the SOP trigger is ascertained to be a false trigger in the case that the received signal quality measure is not above the set level.

22. A control means as recited in claim 21, wherein the measure of the received signal quality is a measure of the error vector magnitude (EVM).

23. A carrier medium including one or more computer readable code segments to instruct one or more processors of a processing system to implement a method in a receiving node of a wireless network that is able to receive packets that exactly or substantially conform to a wireless network standard, each packet including a header that includes, in the case that the packet exactly conforms to the standard, reserved bits set to correct values and bits set to one of a plurality of correct combinations, the method comprising:

receiving a start-of-packet (SOP) trigger that indicates that a packet may have been received;

checking one or more reserved bit locations in the header to determine whether or not they have their respective correct values, continuing to process the packet in the case that the checking indicates that the checked bits have their respective correct values.

24. A carrier medium as recited in claim 23, wherein the header of a packet receivable by the node includes a first field modulated at a known rate and including one or more reserved bit locations, and a second field modulated at a data rate indicated in the first field, the checking including:

processing the first field and checking one or more bits in the first field to determine whether or not they have their respective correct values; and if the checked bits of the first field have their respective correct values, checking the second field for integrity.

25. A carrier medium as recited in claim 24, wherein the packet optionally includes an indication of whether or not reserved bit locations of the second field include an error detecting code formed from at least part of the first field, and wherein the checking the second field for integrity includes:

checking the indication to ascertain whether or not reserved bit locations of the second field include an error detecting code;

if it is ascertained that such an error detecting code is included, checking the included error correcting code; and if it is ascertained that an error detecting code is not included, checking one or more reserved bit locations in the second field to determine whether or not they have their respective correct values.

26. A carrier medium as recited in claim 24, wherein the checking the second field for integrity includes:

checking one or more reserved bit locations in the second field to determine whether or not they have their respective preset values.

27. A carrier medium as recited in claim 24, wherein the receiving node is able to receive packets that conform to one or more of the IEEE 802.11 OFDM standards, wherein the first field is a SIGNAL field and wherein the second field is a SERVICE field.

* * * * *

UNITED STATES PATENT AND TRADEMARK OFFICE
CERTIFICATE OF CORRECTION

| | |
|---|---|
| PATENT NO. | : 7,062,703 B1 |
| APPLICATION NO. | : 10/629383 |
| DATED | : June 13, 2006 |
| INVENTOR(S) | : Keaney et al. |

Page 1 of 1

It is certified that error appears in the above-identified patent and that said Letters Patent is hereby corrected as shown below:

In column 10, line 17, kindly change "RX_11A_CHRKSER" to
-- RX_11A_CHKSER--.

In column 10, line 27, kindly change "RX_11A_CHRKSER" to
-- RX_11A_CHKSER--.

Signed and Sealed this

Fifteenth Day of August, 2006

JON W. DUDAS
*Director of the United States Patent and Trademark Office*